United States Patent [19]
Cross

[11] Patent Number: 6,144,726
[45] Date of Patent: Nov. 7, 2000

[54] TELECOMMUNICATIONS ACCESS COST MANAGEMENT SYSTEM

[75] Inventor: Christopher J. Cross, Denver, Colo.

[73] Assignee: CSG Systems, Inc., Englewood, Colo.

[21] Appl. No.: 09/096,786

[22] Filed: Jun. 12, 1998

[51] Int. Cl.$^7$ ............................................. H04M 15/00
[52] U.S. Cl. ......................... 379/112; 379/114; 379/121
[58] Field of Search .................................. 379/111, 112, 379/114, 115, 116, 118, 119, 120, 127, 144; 455/405, 406

[56] References Cited

U.S. PATENT DOCUMENTS

| | | | |
|---|---|---|---|
| 4,713,761 | 12/1987 | Sharpe et al. | 364/406 |
| 4,979,207 | 12/1990 | Baum et al. | 379/112 |
| 5,148,474 | 9/1992 | Haralambopoulos et al. | 379/111 |
| 5,287,270 | 2/1994 | Hardy et al. | 364/408 |
| 5,291,543 | 3/1994 | Freese et al. | 379/114 |
| 5,325,290 | 6/1994 | Cauffman et al. | 364/401 |
| 5,517,555 | 5/1996 | Amadon et al. | 379/112 |
| 5,598,459 | 1/1997 | Haartsen | 379/58 |
| 5,659,601 | 8/1997 | Cheslog | 455/406 |
| 5,684,965 | 11/1997 | Pickering | 395/234 |
| 5,699,416 | 12/1997 | Atkins | 379/127 |
| 5,699,528 | 12/1997 | Hogan | 395/240 |
| 5,832,068 | 11/1998 | Smith | 379/113 |

*Primary Examiner*—Wing F. Chan
*Assistant Examiner*—Binh K. Tieu
*Attorney, Agent, or Firm*—Marsh Fischmann & Breyfogle LLP

[57] ABSTRACT

A Telecom Access Billing System provides the capability for a communication carrier service provider to substantially automate the payment to other communication carrier service providers for the use of their services and equipment. Billed charges are received in a variety of forms from the communication carrier service providers which are providing the services. A processor uploads the information, checks its integrity, and converts it to a format in which it can be further processed. Once the information has been uploaded and converted, a validation process is performed in which the individual items of the bill are checked as to whether the rate information charged by the communication carrier service providers matches the rates which have been either negotiated or established by a third party. Any discrepancies noted in this comparison process are included in a dispute report which is associated with the invoice on which the billed charges appear. The user of the system may then review the invoices in conjunction with any discrepancy amounts which have been noted. An automated payment module then provides for the electronic transfer of funds to the communication carrier service provider for approved invoices.

28 Claims, 18 Drawing Sheets

| | VENDOR | |
|---|---|---|
| FIND: | | |

VENDOR NUMBER: 10098

VENDOR NAME: VENDOR

ADDRESS: 134 ELM STREET

SUITE 3400

CITY: CHICAGO

STATE/PROVINCE: IL        POSTAL CODE: 80119

OK   NEW   CANCEL

TELECOMMUNICATIONS ACCESS COST MANAGEMENT SYSTEM

FIELD OF THE INVENTION

The present invention relates generally to billing systems, and more particularly, to a system for verifying charges between communication carrier service providers.

The system is particularly apt for use in automatically verifying, paying and/or analyzing billed charges between telecommunication carriers.

BACKGROUND OF THE INVENTION

The provision of communication services to businesses and individuals often entails the transmission of voice, image and other data via the use of communication devices maintained by different communication carrier service providers. While the provision of such communication services may be adapted to appear "seamless" to users, e.g., via consolidated billing by a single carrier to its customer, the underlying cross-carrier services are in fact billed between the cooperating service providers on a periodic basis.

By way of primary example, multiple telecommunication carriers may be utilized to complete a given long distance call between two remote locations. The call may be initiated by a caller via interface with the caller's local telephony carrier service provider, transferred for interstate transmission to a long distance service provider, and further transferred to a local telephony service provider for the called party. In such an arrangement, while the caller's local telephony carrier service provider will bill the caller for charges associated with the call, the long distance service provider and called party local telephony carrier may bill the caller's local telephony service provider. The amount charged between various communication carrier service providers may be as per regulated rates and/or agreed upon contract rates, and may further depend upon a variety of other considerations (e.g., volume of communications between carriers, time-of-day of communications between carriers, degree of special access between carriers, bandwidth allocated for communications, etc.).

As will be appreciated, given the ever-increasing volume of communications involving multiple carriers, the handling of cross-carrier billings can be quite complex. Concomitantly, the validation, payment, and analysis of such cross billings can be burdensome, particularly in view of highly labor-intensive techniques currently employed to provide such functionality.

SUMMARY OF THE INVENTION

Described herein is a system and method for improved handling of billed charges between communication carrier service providers. The system contemplates an arrangement in which a first communication carrier service provider is billed for services by a second communication carrier service provider, the billed charges most typically received in a first digital file format. Of importance, the billed charges include a plurality of entries which have a corresponding billed charge rate components. In one aspect of the invention, when the first carrier receives the billed charges, corresponding reference charge rates are automatically retrieved from a database maintained or otherwise readily accessed by the first carrier. The billed charge rates and the reference charge rates are then automatically compared in order to determine if a discrepancy exists therebetween.

The system described herein may include a processor which may access data (e.g., billed charges) from a plurality of different types of storage media in accordance with preprogrammed instructions and/or in accordance with inputs from at least one graphical user interface (GUI). In conjunction with accessing the billed charges, the billed charges may be initially uploaded from the storage media to an upload module in the processor. The option also exists for manually loading the billed charges into the upload module through the GUI. Once the information has been uploaded, a variety of analyses may be performed.

In one arrangement, an integrity check is performed on the billed charges to confirm that no corrupted data has been transmitted. A duplicate billing check is also performed to be sure that the billed charges currently being received are not duplicates of charges previously transmitted. After these checks have been performed and the incoming billed charges have been parsed, a conversion process may be performed in order to convert the bill data into a second digital file format which can be processed internally by the system (e.g., via relational database management techniques). A report may also be generated documenting the upload and conversion of the billing information. When the data upload/conversion is complete, both the report and the billed charges are loaded into a production database.

Once in the database, a validation process may be performed to check the actual charged rates against reference charge rates. The reference charge rates may be negotiated between the parties or previously established by third parties (e.g., regulatory agencies). The billing information is retrieved from the production database and comparisons are made between what the second service provider charged versus what the first service provider has identified as the appropriate reference rate. Also, this comparison is made for the tariffs or other third-party established rates. At this point, any discrepancies between the actual charged rate and the reference rate are noted.

The validation process may be performed by an automatic validation module incorporated in the graphical user interface. The process may be performed automatically after the billed charges have been uploaded to the database. The automatic validation module includes all the criteria necessary in order to validate the billed charges. The automatic validation module may be configured such that the first service provider may program in selected requirements for performing the validation process.

The discrepancy information which is generated in the validation process may then be used in a dispute-tracking process. For example, for billed charges in which a discrepancy is noted, a dispute report may be generated which includes the discrepancy amount. A dispute tracking module may be included in the GUI which provides the system user with a number of displays which may be used to enter comments and other information relating to the dispute report. Once the dispute report is generated, the system user is provided the functionality to associate the billed charges with the dispute report. The system user may also update, amend or resolve any dispute reports which have been previously generated for other billed charges.

Once a dispute report is generated for the billed charges, a system user may be provided the opportunity to either approve or disapprove an invoice, which the billed charges are part of, through a bill review and approval process. A bill review and approval module may be incorporated into the GUI which provides the system user the ability to access and display invoices along with dispute reports. In one aspect of the invention the invoices and dispute reports are displayed to the system user in a hierarchal structure. By using the computer mouse, the user may select subcategories of the invoices and dispute reports to reveal additional information about a particular matter. Invoices and disputes may be associated through the dragging and dropping of a particular invoice on top of a particular portion of the dispute report.

Once all the billing and dispute information has been reviewed, the system user may either approve payment for the invoice or may reject the invoice and have it returned to the validation process. If the invoice is disapproved, the system user can insert notes in the invoice as to why it was rejected. If the system user approves the invoice in the bill review and approval module, that invoice is then forwarded for automatic payment. The user may approve the billing information even if a dispute report has been associated and can order that a reduced amount be paid which reflects the discrepancy noted.

Once a invoice has been approved for payment, an autopayment process can be triggered to electronically pay the invoice. An automatic payment module may be incorporated into the processor. As part of the autopayment process, a precautionary procedure may be used which requires a certain "level" of approval (e.g., by upper management personnel) to pay the invoice if the charges exceeds a predetermined amount. In the case where a dispute report has been attached to the invoice, the short pay amount may be electronically transmitted to the vendor, and the dispute report otherwise provided to the vendor for review. Once a dispute report is resolved, the status of this report may be changed in the dispute-tracking module.

Numerous additional aspects and advantages of the present invention will become apparent to those skilled in the art.

DESCRIPTION OF THE DRAWINGS

FIG. 15 discloses a screen display for providing vendor information.

FIG. 17 discloses a screen display which provides for searches of information currently displayed in the main window.

DETAILED DESCRIPTION

Figure 1:
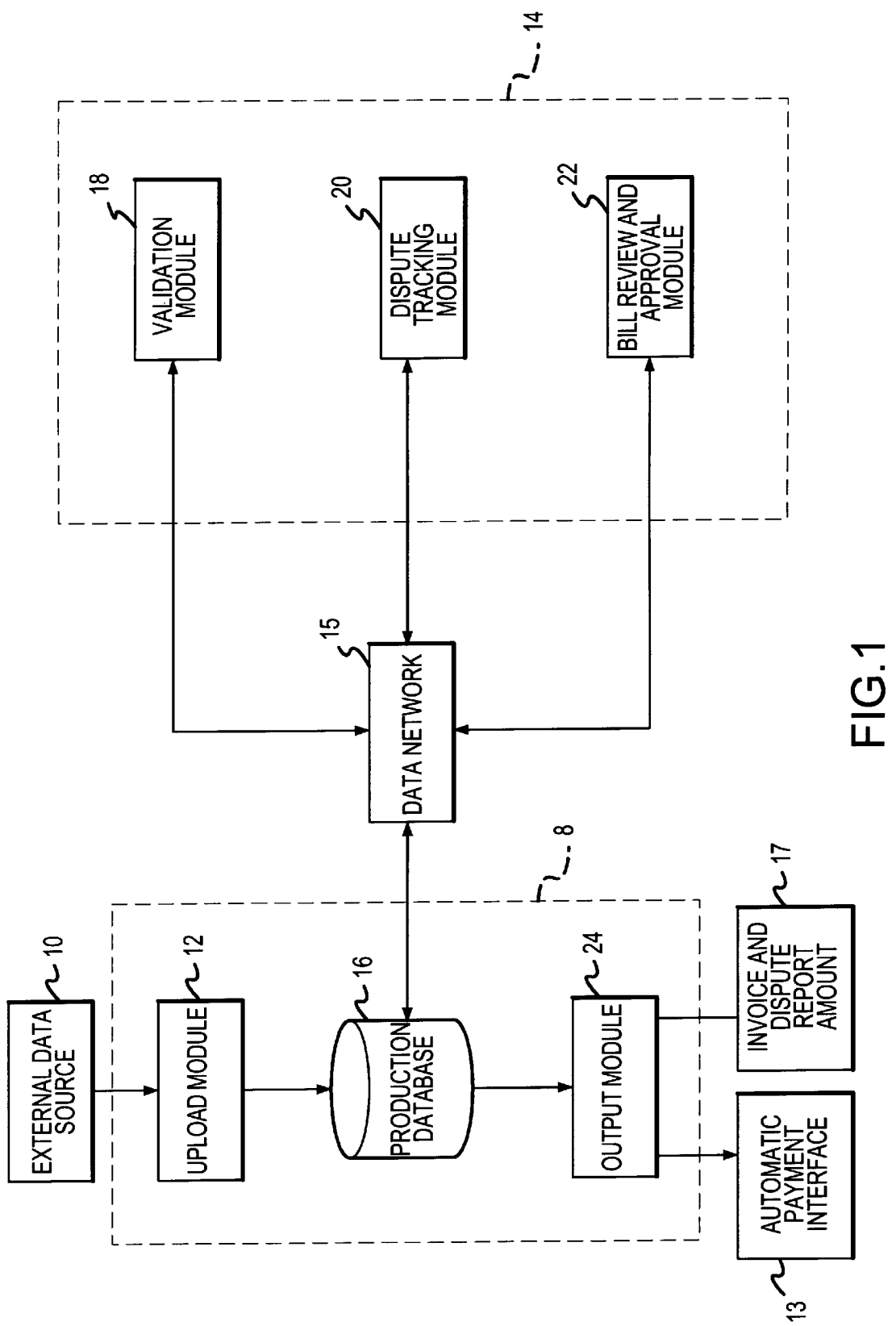
FIG. 1 discloses a system diagram for a cost tracking system which shows internal and external connections to a cost tracking server and graphical user interface.

Disclosed in FIG. 1 is a system diagram for the cost tracking system which shows in particular the internal and external connections for processor 8 and graphical user interface 14. The processor 8 may be implemented as a UNIX or NT server which may establish ODBC TCP/IP connections over a data network 15 with remotely located processing devices. The data network 15 may be the Internet, an intranet, or any type of node based computer system. Within the processor are upload module 12, production database 16, as well as the output module 24. These elements will be discussed in greater detail below.

Also shown in FIG. 1 is graphical user interface (GUI) 14. In one embodiment of the invention the GUI is a personal or other stand alone computer which may operate in the NT or Windows 95 environment. The GUI includes the capability to display information, allows the system user to initiate commands, and provide for the manual input of data. Communication between the GUI 14 and the processor 8 is established over a ODBC TCP/IP connection established over data network 15. The system diagram in FIG. 1 shows the use of a single GUI for explanation purposes only. The cost tracking system described herein may incorporate multiple GUI's. The GUI 14 further includes validation module 18, dispute tracking module 20, and bill review and approval module 22. These modules will be described in greater detail below.

The cost tracking system, as described herein, substantially automates the bill processing by a customer for charges made by a vendor for use of its' equipment or services. The embodiments described herein refer to the billing procedures for telephony services, however one skilled in the art would realize that the system described herein may have applications which extend beyond this particular area of business and technology. As is well known, there are many different communication service providers which provide telephony services for individuals and businesses. These providers may not own all the communication lines which are used in order to provide their services. For example, a long-distance phone carrier in most cases does not own the local phone lines but, instead, must obtain access to these lines through a vendor. Agreements are established between the long-distance carriers and the local phone companies for use of particular lines. Periodically, the vendor will send the customer a bill which includes charges for use of its lines. The system described herein substantially automates the processing and payment process for these billed charges.

Referring again to FIG. 1, a number of additional elements are shown to have external connections with the processor 8. One connection is made to external data source 10. External data source 10 represents the submission of the billed charges by the vendor to the customer. The vendors may submit the billed charges through a variety of means. Some examples are CD-Rom's, diskettes, 9-track tape, cartridge tape, and electronic file transfer. The information on these different media may be in a number of different formats. Some examples of possible data formats are CABS, CENTREX, AEBS, CRIS, as well as any custom formatted carrier electronic bill data.

Two other connections from the processor are made to autopayment interface 13 and the invoice and dispute report output 17. The autopayment interface 13 facilitates the automatic payment of approved charges through electronic or other means. The invoice and dispute report output provides copies of invoices and dispute reports to the vendor. One implementation for the invoice and dispute report output 17 is a printer which provides these items in hard copy format. These items may also be provided in an electronic document format.

As was mentioned above, the processor 8 includes a number of internal elements. Upload module 12 performs the function of uploading the billed charges from external data source 10. In addition, this module performs a variety of data analysis functions on the uploaded information, and converts the information from whatever format it is received to a relational database format. Once this conversion is complete, the billed charges are stored in production database 16. Database 16 is a relational database which contains multiple tables which are searchable by the system user. This database may be implemented in a number of relational formats which may include Oracle, Sybase, or any other relational database software. Also stored in the production database is variety of reference information which may be used by other components of the system to perform analysis on the billed charges.

The processor 8 further includes output module 24. This module provides for the processing of billed charges once they have been approved for payment. This processing may include the initiation of autopayment for the charges as well as the outputting of any necessary documentation about the transaction.

GUI 14 also includes a number of internal processing modules. The automatic validation module 18 retrieves the converted billed charges from the production database and performs a variety of processes on the billed charges which includes a check on the validity of the vendor making the charge, the detection of any discrepancies in the billed charges received when compared against reference information in the production database, and the calculation of any discrepancy amounts.

Any discrepancies detected in the automatic validation module are further processed in dispute-tracking module 20. The dispute-tracking module 20 creates a dispute report which describes the discrepancy and discrepancy amount. This dispute report is then associated or otherwise connected with the billed charges. The bill review and approval module 20 receives the billed charges, and within this module, the user of the system may access the billed charges and review any of the charges made by the vendor. The user can also access any dispute reports which have been generated at the dispute-tracking module 20. At the bill review and approval module 22, the user may either approve payment of the billed charges or reject the bill and return it to the database for further review in automatic validation module 18.

In one embodiment of the invention, modules 18, 20, and 22 are part of a cost tracking software package which is downloaded on to the GUI. This software may operate in the Windows 95 or NT environment. Through the connections established over the data network from the GUI to the processor, these modules may be used by the system user to access, perform searches, and retrieve data from the production database 16. The production database includes the necessary logic to facilitate this access.

In operation, billed charges from a vendor are uploaded from the external data source and received at the upload module 12. The upload module 12 provides the capability to upload data generated by a vendor's billing system into the production database. The uploading of data may be incorporated as an automatic function for processor 14. The system user may program the server to make inquiries of the external data sources as to whether there is data available to upload. This process may also be initiated manually by the system user through a command submitted through the GUI. During the upload of the vendor's billed charges, the upload module performs data integrity and format integrity error checking on the uploaded information and prevents corrupted data from being uploaded into the system. The upload module also queries the production database to ensure that duplicate charges are not loaded into the system. Finally, the upload module records information pertinent to the load (time, duration, number of records) and associates that data to the billed charges being loaded in order to track receipts of vendor's bills.

Figure 2:
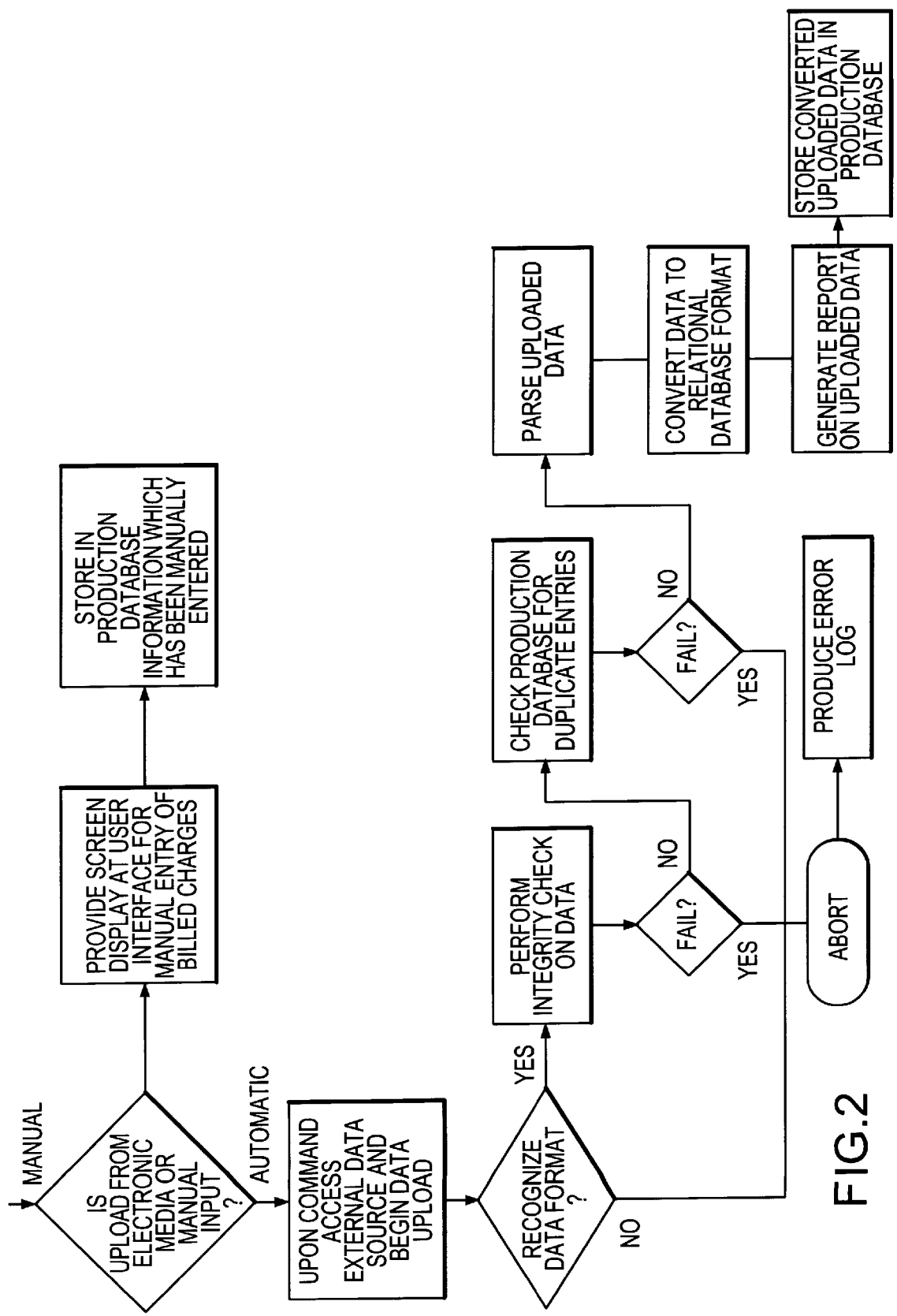
FIG. 2 discloses a flow chart which describes the operation of the upload module.

The flow chart in FIG. 2 describes in detail the steps performed in the data upload process. At the beginning of the process, a query is made as to whether the uploading of the billed charges will be an automatic or a manual process. If the process is manual, the user of the system pulls up the desired screen display through the GUI and enters the appropriate information for the vendor. This information is already in the relational database format so it is stored directly in the production database. If the upload of information is from an electronic media or other electronic source, the upload of the information from the external data source 10 is initiated. After the information is uploaded to the upload staging database, a first query is made as to whether the billed charges are in a recognizable format. As was described above, the vendors may store their billed charges in a particular electronic format which the processor, and more specifically, the upload module needs to translate in order to store the information in the production database. If the information format is not recognizable, the process is aborted and an error log for this step is produced. If the information is in a recognizable format, an integrity check is then performed. This check is performed to be sure that no corrupt data is loaded onto the production database. If corrupted data is detected, the process fails and the download is aborted. If the data passes through the integrity check, the upload module performs a scan of the billed charges which have already been downloaded onto the production database to be sure that none of the entries are duplicates of billed charges already in the system. If any duplicates are detected, the process fails and the upload is aborted.

If the data passes through the integrity and duplicate entry check, the information stream is then parsed into individual billing entries. Each data format has its own header information which the upload module translates and uses to properly parse the information. Once this step is complete, the upload module converts the billed charges from their uploaded format to a relational database format for storage onto the production database. A number of relational database formats can be used for this particular process. These formats may include Oracle, Sybase, or any other known relational database software. After the conversion process is complete, a report is generated on the uploaded and converted billed charges and the information is then stored in the production database. The upload logs are populated with data which includes the upload times, durations, and number of records read by type.

Once the billed charges have been properly converted and stored in the production database, the analysis of the billed charges may begin. A first portion of this analysis is done in automatic validation module (AVM) 18. The basic function of the automatic validation module is to perform comparisons between the billed charges and reference information previously stored in the production database. This reference rate information includes such things as rates agreed to by the parties for use of the circuits as well as any tariffs established by third parties. The automatic validation module provides the user with the ability to query the database for detailed billed items using multi-dimensional criteria across billing account numbers (BANs) and bill dates. This criteria may include all charges for a particular vendor over a particular time period or it may be narrowed down to a particular charge. The AVM has access to contract data, any circuit mileage and rate data to support mileage rate calculations where applicable, circuit and inventory data to support charge validation by circuit, and PIU (percents interlate utilization ) data to support PIU discounting. This module also allows bulk dispute item selection and flagging and allows the customer to maintain a comprehensive catalogue of reason codes that are associated to disputable bill items. Additional functionality may include the re-analysis of billed charges which have gone through the system once and have been disapproved for payment.

The automatic validation module described herein includes the functionality to accept custom programming. The module is programmable by the system user to perform the validation process according to unique requirements established by a particular client. This programming can be done through the GUI. For example, any of the criteria described above, such as contracted rates and tariffs, that are used in the validation the billed charges may be changed based on the requirements of the party performing the analysis. The AVM is designed such that the user may interact with and maintain client specific requirements through the GUI.

The AVM also has capability to produce and store summary reports for the billed charges processed by the AVM. These reports may include information relating to the number of validation errors found by reason code and in total. The summary reports of the validation processing may also provide information relating to cycle breakdown of billing errors found in each invoice processed, breakdown of error codes by type, dollar amounts, number of errors types found, etc.

Figure 3:
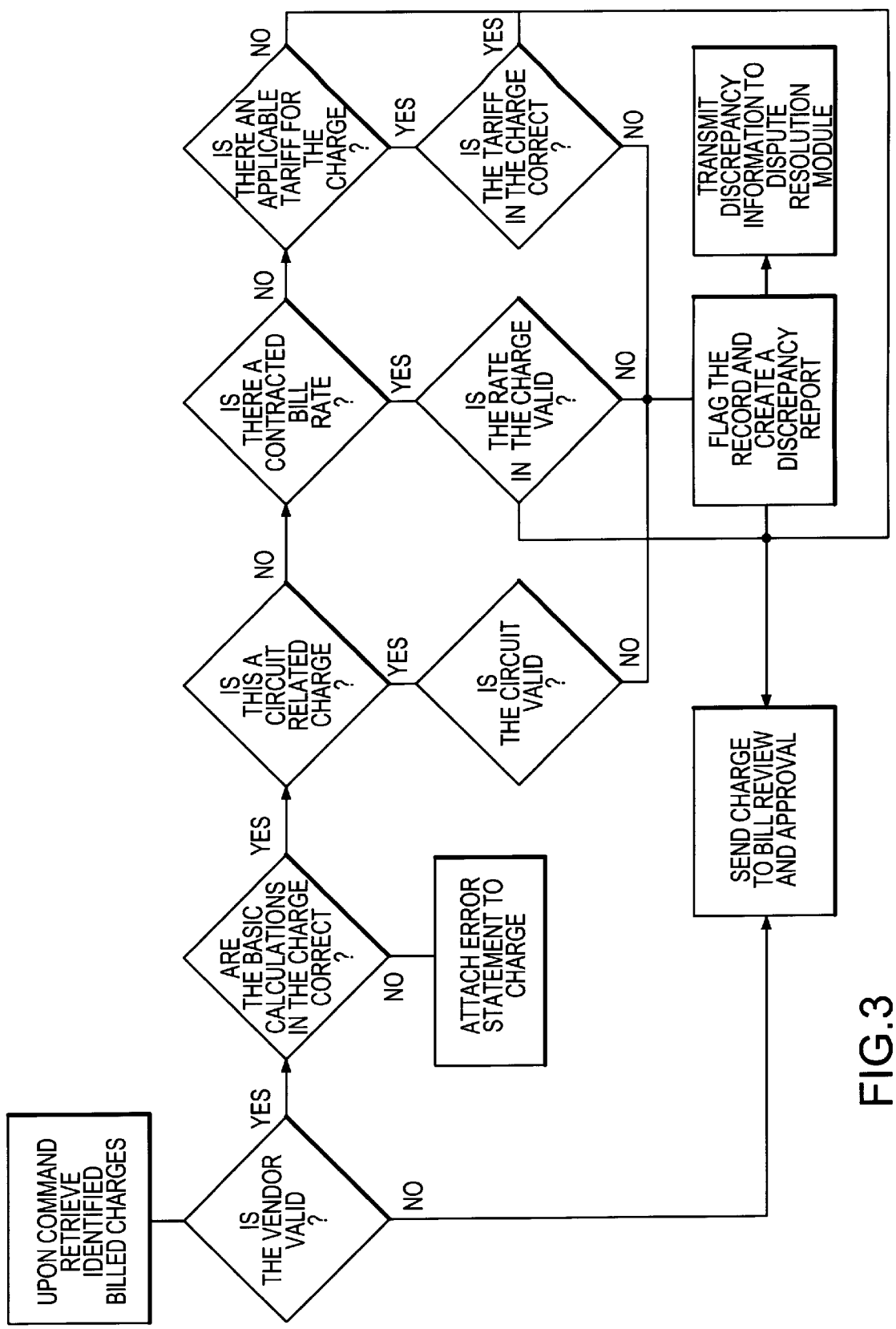
FIG. 3 discloses a flow chart which describes the operation of the automatic validation module.

Disclosed in FIG. 3 is a flowchart which describes an example process which may be used to analyze billed charges for a communications service provider. Upon a command by the user or through an automated process, the automatic validation module accesses the production database and uploads the billed charges which have been identified through user established criteria. This criteria may include the particular vendor, a particular billing entry, a particular circuit, as well as the re-analysis of a bill which had been disapproved for payment. The production database provides for searches using a variety of different search terms. After the billed charges have been uploaded, a query is made as to whether the vendor is valid. Included in the production database is a list of vendors which have provided services to the customers. If the vendor is not on the known or approved vendor list, the bill is sent directly to the review and approval module. If the vendor is identified, the module performs a check on the billing statement to confirm that, based on the vendor provided usage rates, the charges shown are correct. If these charges are not correct, an error statement is attached to the billed charges. A query is then made as to whether the billed charge is related to use of a particular circuit. If this is a circuit charge, another query is made as to whether the circuit is valid. According to agreements made between the parties, access is provided to particular circuits according to certain terms. After certain amounts of time, circuits may be deactivated or access is denied to that circuit. The circuit validity check determines whether the customer is being billed for accessing a circuit which had been deactivated or was not accessible by the customer.

If it is determined that the circuit is invalid, the billed charge is flagged so that a discrepancy report can be generated. If the circuit charge is valid, a check is then made as to whether there had been a contracted rate between the parties. The parties will enter into agreements charging particular amounts for the use of particular circuits. If the rate charged is not valid according to the reference charge rates stored in the production database, the billed charge is flagged, and a discrepancy amount is calculated. If the rate is valid and all other information check outs in the bill, the billed charge is sent to the bill review and approval process.

If there had been no contracted usage rate between the parties, a final query is made as to whether there is an applicable tariff for the charge. Governmental entities or other third parties may impose a tariff or other charges on the use of particular services within their jurisdiction. If there is a tariff associated with the billed charges, this tariff rate is compared against a reference rate stored in the database. If the tariff rate is not correct, it is flagged, a discrepancy is calculated, and this discrepancy information is transmitted to the dispute tracking module. If the tariff charges agree, the billing information is transmitted to the production database for access through the review and approval module. Any discrepancy information which had been calculated in the automatic validation module is transmitted to the production database so that it may be retrieved through the dispute tracking module 20. The dispute tracking module 20 provides the capability to create, package, and track disputes. It allows the system user to query the database for disputable items across a number criteria, which includes BAN's and bill dates, and then include those various details in a dispute report. That dispute report then becomes an entity within the system, which can be tracked, reviewed, and finally closed after resolution with the vendor with whom the dispute is being pursued. The dispute report is linked to the billed charges from which it was created, and is viewable from other modules in the processor.

Figure 5:
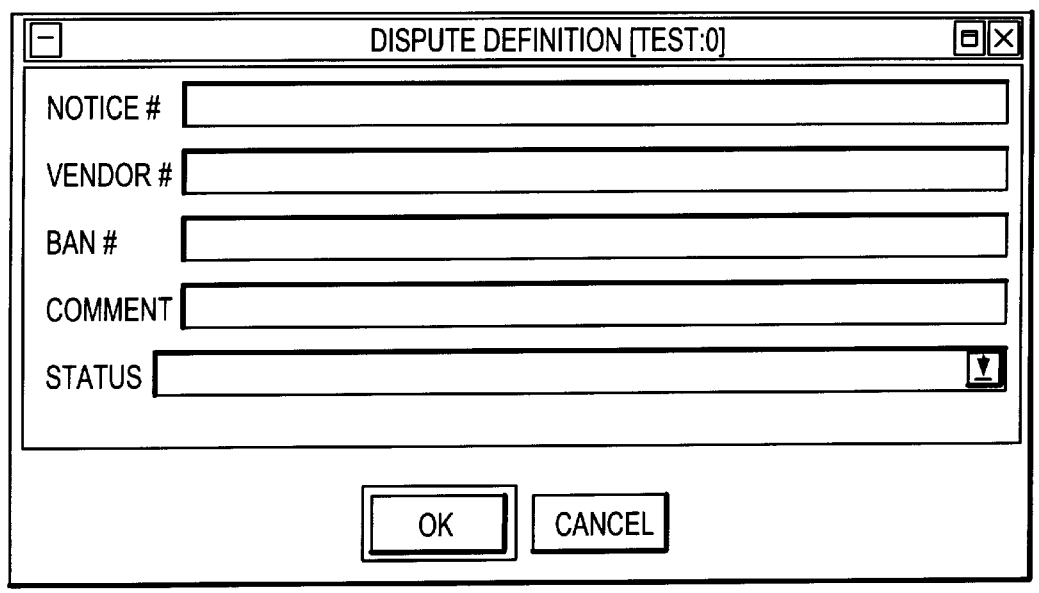
FIG. 5 discloses a screen display for the new dispute window.

In order to create a dispute report from discrepancy information, the system user, from the GUI, first accesses the main window screen for the cost-track system. The main window is the screen display which provides the starting point from which all screen displays discussed herein are accessed. The main window is also the screen display which is returned to when the other screen displays are closed out. This screen is shown in FIG. 5. In this main window, there are a number of pull-down menus which the system user can access to perform a variety of functions. In the case where the system user wishes to create a new dispute report, the user would first select the file on toolbar 30, and then select new 32, and then dispute 34 from the pull down menus. Once these selections have been made, the screen display disclosed in FIG. 5 is provided for the system user.

Figure 7:
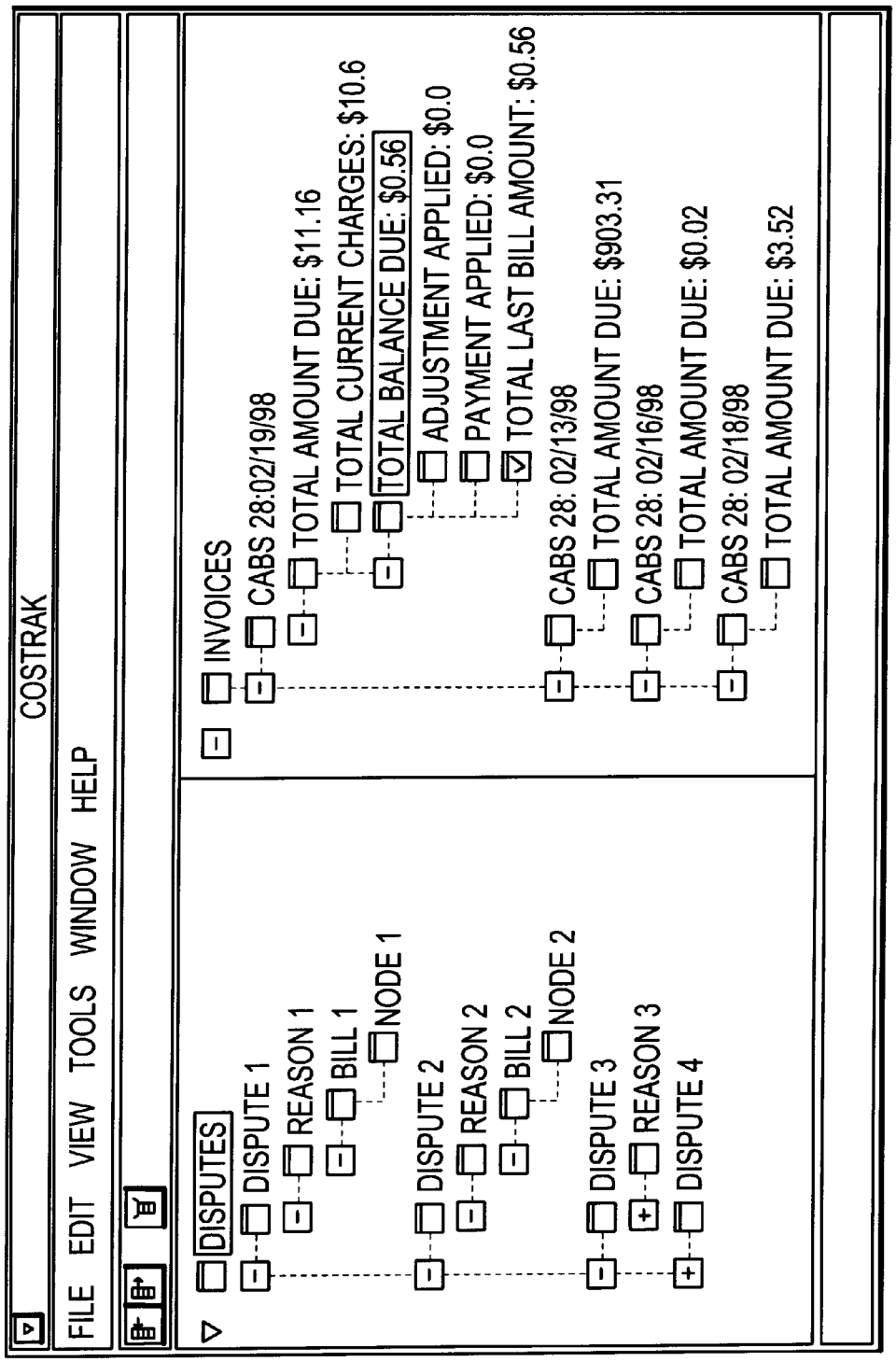
FIG. 7 discloses a screen display for the main window which includes located dispute reports and invoices.
Figure 8:
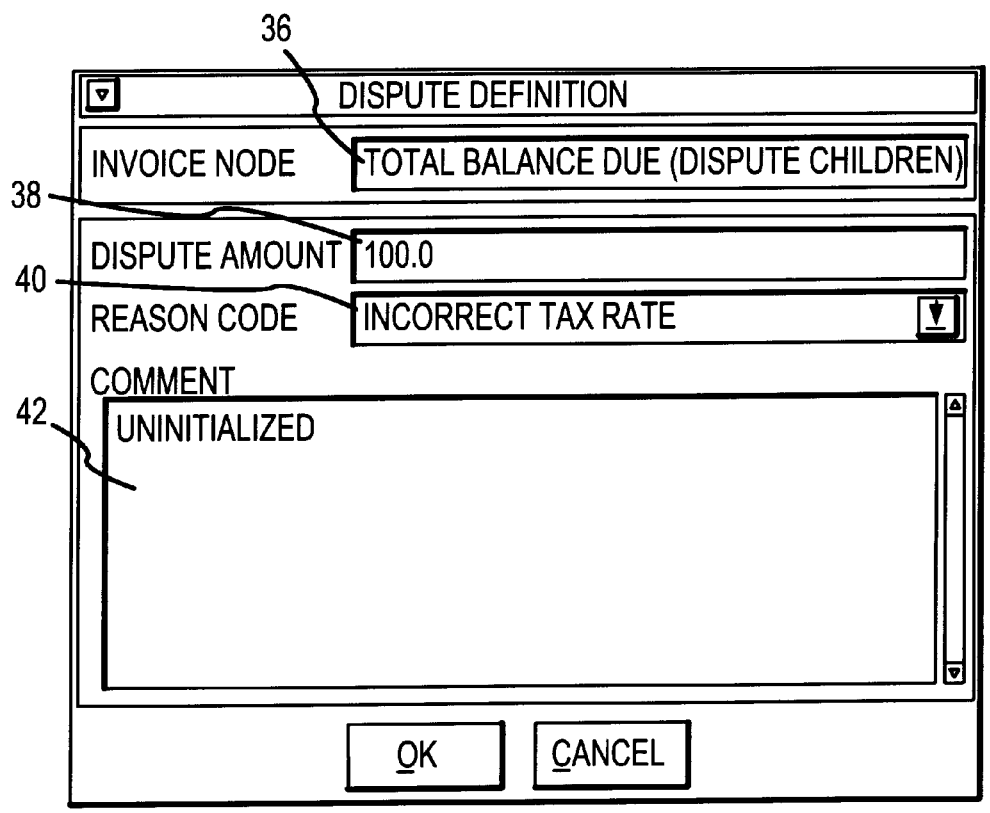
FIG. 8 discloses a screen display for the definition of a dispute report.

The screen display shown in FIG. 5 provides the system user a mechanism to enter information about the dispute report to be created. This information to be input may include such things as Notice #, Vendor #, BAN # and any other relevant information. Once the creation of the dispute report is complete, it appears on the main window. FIG. 7 discloses a screen display of the main window which includes a series of dispute reports which have been created. All the dispute reports shown in the left hand column are arranged in a hierarchial structure. Beneath each dispute are a number of subcategories containing information about the dispute. By using the mouse and left clicking on any of these reports or subcategories, additional subtopics are displayed. Right clicking on any of these icons in the hierarchal structure will initiate the display of a screen which contains specific information about the item in question. For example, shown in FIG. 8 is a dispute definition screen for a particular dispute. Included in the detailed information are items such the node selected from the dispute report hierarchy 36, the disputed amount 38, a reason code 40, and any comments included in the dispute report 42. When the user is finished viewing the dispute report information, the okay button may be selected and the system user is returned to the main window. The informational screen displays for a particular dispute, may also be used to amend information within the dispute report.

Figure 4:
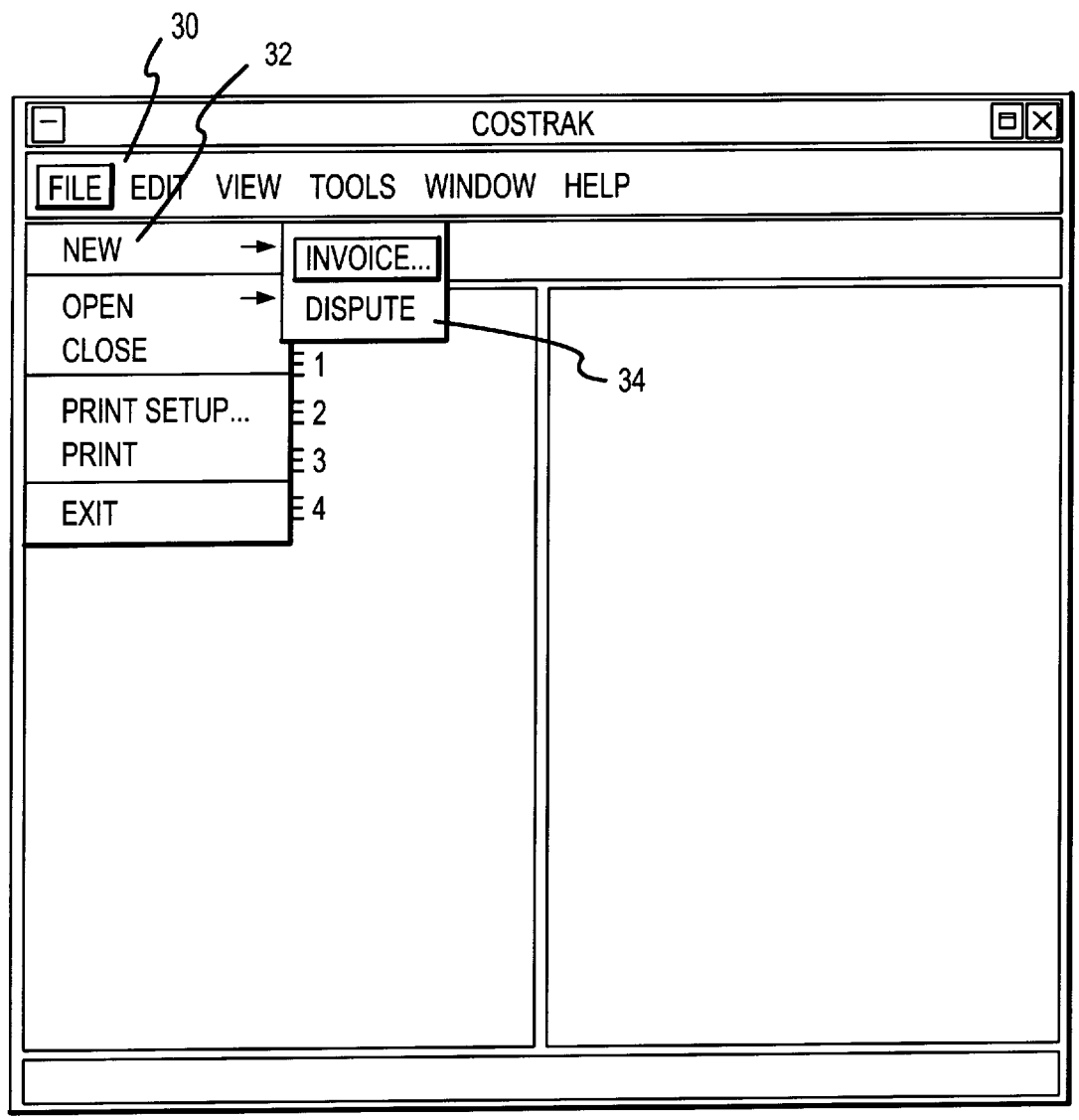
FIG. 4 discloses a screen display for the main window.
Figure 6:
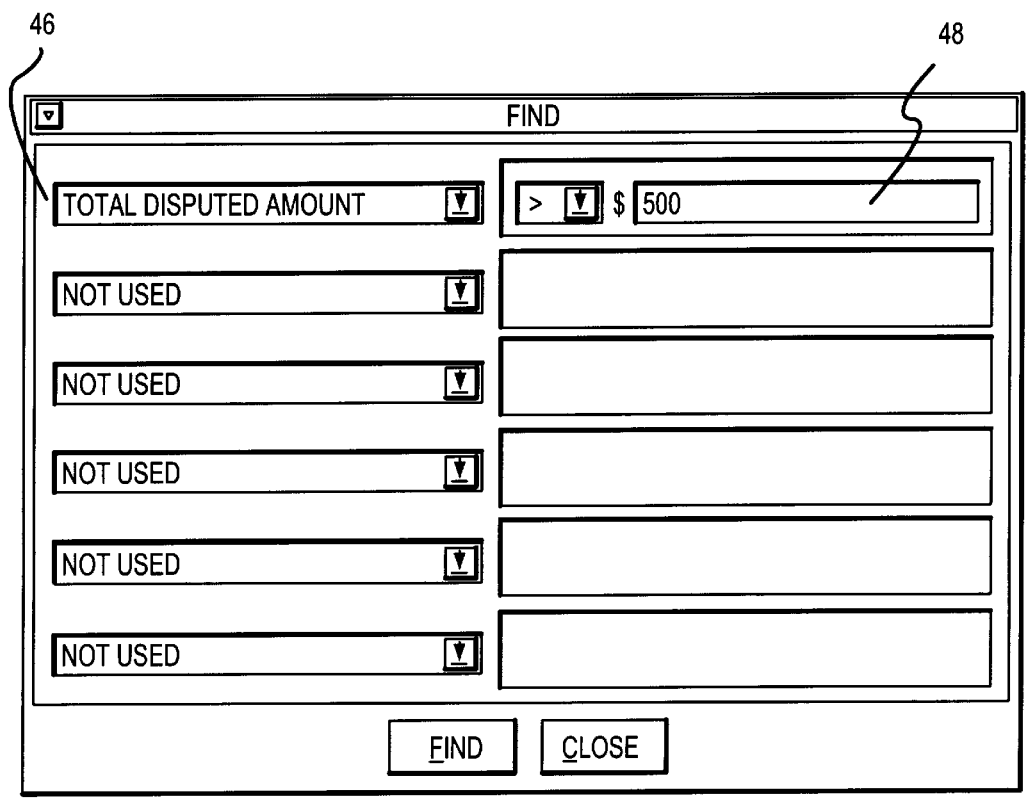
FIG. 6 discloses a screen display for locating dispute reports.

Returning again to the main window screen display disclosed in FIG. 4, a system user may also access dispute reports which have already been created in order either amend or delete these reports. Under the file block 30, the system user would choose open and then dispute. Once this choice is made, the screen display disclosed in FIG. 6 would appear would and provide the user with various subject areas in which to search for disputes. The system user may choose the pull down menu 46 which discloses a number of subject headings in which to search. These headings may include dispute report number, total disputed amount, particular vendor, BAN, as well as a variety of other topical headings. The scope of the search may be limited by entering information in block 48, and once the user presses okay, a list of dispute reports which match the search criteria are displayed in the main window screen display.

Figure 9:
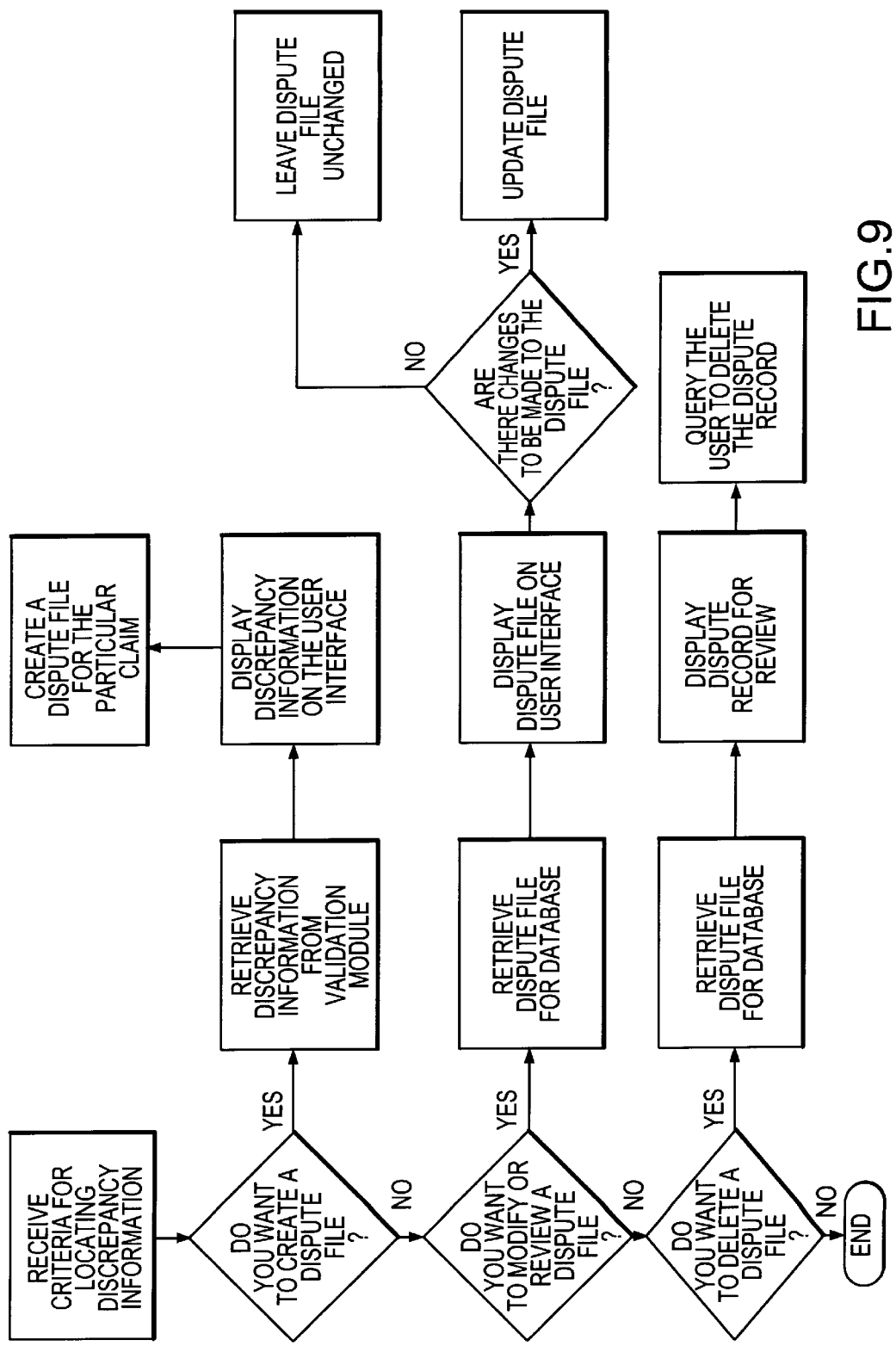
FIG. 9 discloses a flow chart which describes the operation of the dispute tracking module.

FIG. 9 describes in detail the steps performed by the dispute tracking module. As was described above, the dispute tracking module is provided access to discrepancy information generated by the automatic validation module. Upon receipt of this information, the system user may then generate a dispute report. If the user wants to create a dispute report for a discrepancy detected in the billed charges, the module retrieves this discrepancy information. The discrepancy information is displayed to the system user and a screen display is provided to enter a dispute description. After this dispute description is entered, the module associates all of the appropriate billing information, vendor, BAN, dates, etc. in the dispute report. This information provides the connection between the billed charges and any discrepancies which have been detected. This dispute report then can be stored in the production database.

As described above, the dispute resolution module also provides the opportunity to modify, review, or delete a dispute report. If the user wants to modify or review a dispute report, the user enters the information through the GUI and the dispute module will retrieve the particular dispute report from the production database. This retrieval of a dispute report can be done in conjunction with functions being performed in other modules in the cost tracking processor 8, for example the bill review and approval module 22. Once the dispute report has been retrieved, it is displayed in its hierarchal structure through the GUI. The system user is then provided the option to make any changes or amendments to the dispute report. If the user does not make any changes, the dispute report is left unchanged. If a change is made to the dispute report, the user enters this change through the GUI and it is incorporated into the dispute report.

The user of the system also has the option of closing a dispute report once the discrepancies noted in the billed charges have been reconciled. To begin, the user enters the identifying information for the dispute report through the search function incorporated in the GUI, and the appropriate dispute report is retrieved. The dispute report is displayed and the user of the system, through a particular dialog box on a screen display, may indicate that the dispute has been resolved and this dispute report should be closed. A record of this dispute is kept in the production database and this record includes all information relating to the creation and closing of the dispute.

After the billed charges have been processed in the automatic validation module and any discrepancies noted in the dispute module, the billed charges are combined in invoices for the different vendors, and the system user then approves or disapproves the invoices in the bill review and approval module 22. The bill review and approval module supports the process of reviewing invoices and dispute reports and approving invoice/dispute packages for payment or formal dispute. Using this module, users may view summary information on the charges (including short pay/ disputed amounts), link to detailed information on bill items (linked to validation/bill research module), or link to dispute detail (dispute-tracking detail). Finally, the bill review and approval module provides the functionality to associate summary invoice amounts with general ledger codes for accounting and financial tracking.

Figure 10:
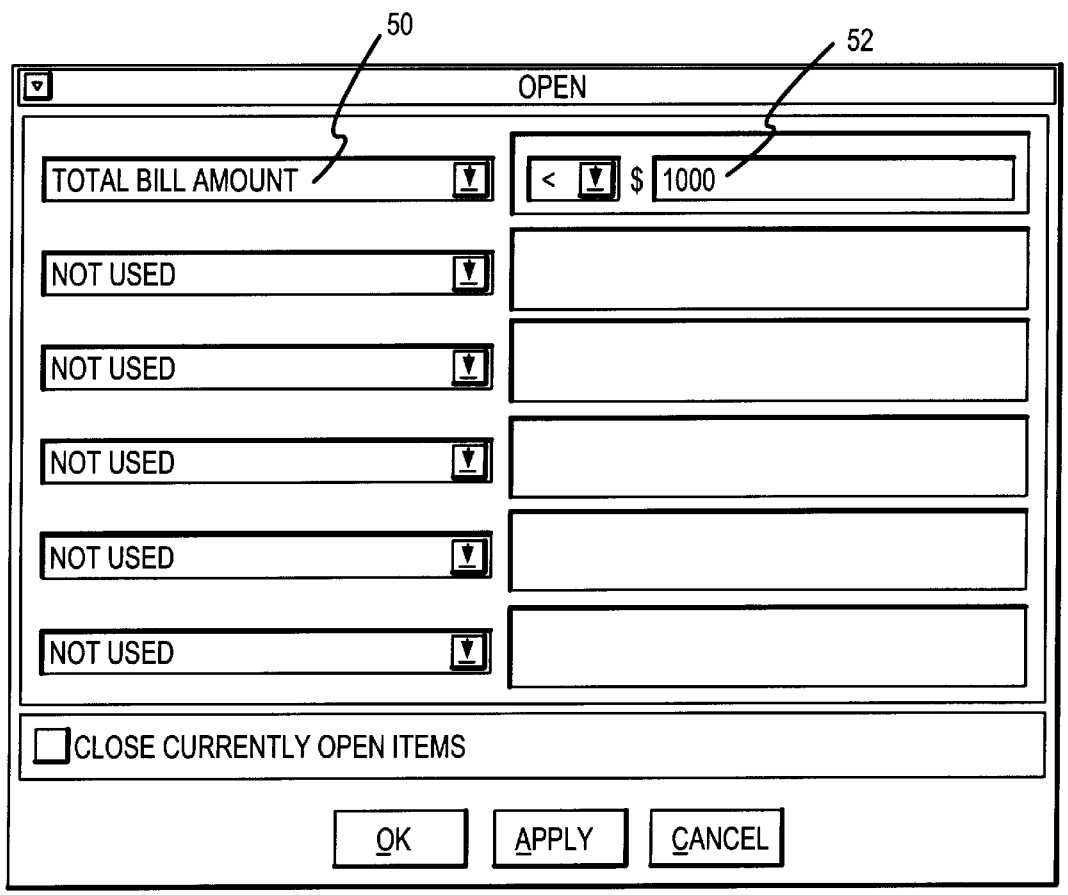
FIG. 10 discloses a screen display for locating invoices.
Figure 11:
FIG. 11 discloses a screen display which lists invoice properties.

Before a invoice can approved, it must first be manually reviewed by the system user. The dispute reports associated with that invoice should also be reviewed. The invoices may be displayed to the viewer in a manner similar to how the dispute reports were displayed. Referring again to the main window shown in FIG. 4, the system user would choose the file block on tool bar 30, then choose the open block 32, and then choose invoice from pull down menu 34. At this point, a screen display will be provided which allows the user to search for invoices. An example screen display is shown in FIG. 10. By choosing the pull down menu 50 in this screen display, the system user can choose from a variety of search areas. These areas may include invoice numbers, vendors, bill amounts, etc. In the example where the total bill amount is the search criteria used, this search can be further limited by entering a maximum value in block 52. Once the search has been completed, all the invoices which meet the search criteria are displayed on the main window. An example of a retrieved list of invoices is shown in FIG. 7. As with the dispute files, all information about a particular invoice are presented in a hierarchial structure. For example, under a invoice CABS 28: Feb. 19, 1998, there are a number of topic headings which include the total amount due, beneath that the total charges and the total balance due, and further beneath that are the total balance due, the adjustment applied, payment applied, as well as the total last bill amount. By right clicking with the mouse on any of these items for information about that portion of the invoice may be viewed. For example, by right clicking on the invoice description portion, a screen display like the one in FIG. 11 is provided. This screen display provides the system user with the current status of the invoice, including any disputed amounts.

One piece of information which may be necessary in order to approve payment of a particular invoice may be whether a particular dispute report is associated with that invoice. Invoices and dispute reports are associated through a manual function performed by the system user. The first step in this process is to display both the dispute reports and the invoices on the main window. The screen display provided in FIG. 7 shows both the disputes and invoices on the main window. In order to associate a particular dispute with an invoice, the user takes advantage of the drag and drop functionality included in the system. For example, if the system user wishes to associate a dispute 1 with the invoice CABS 28: Feb. 19, 1998, the system user would grab the invoice icon with a left click of the mouse, drag it across the screen and drop it on top of the dispute report icon. From that point on the invoice detailed information will contain a reference to the dispute report to which it has been associated. Conversely, the dispute report will now note discrepancy amounts included in the invoice. The drop and drag functionality described above provides the flexibility to associate multiple invoices with a particular dispute report.

Figure 12:
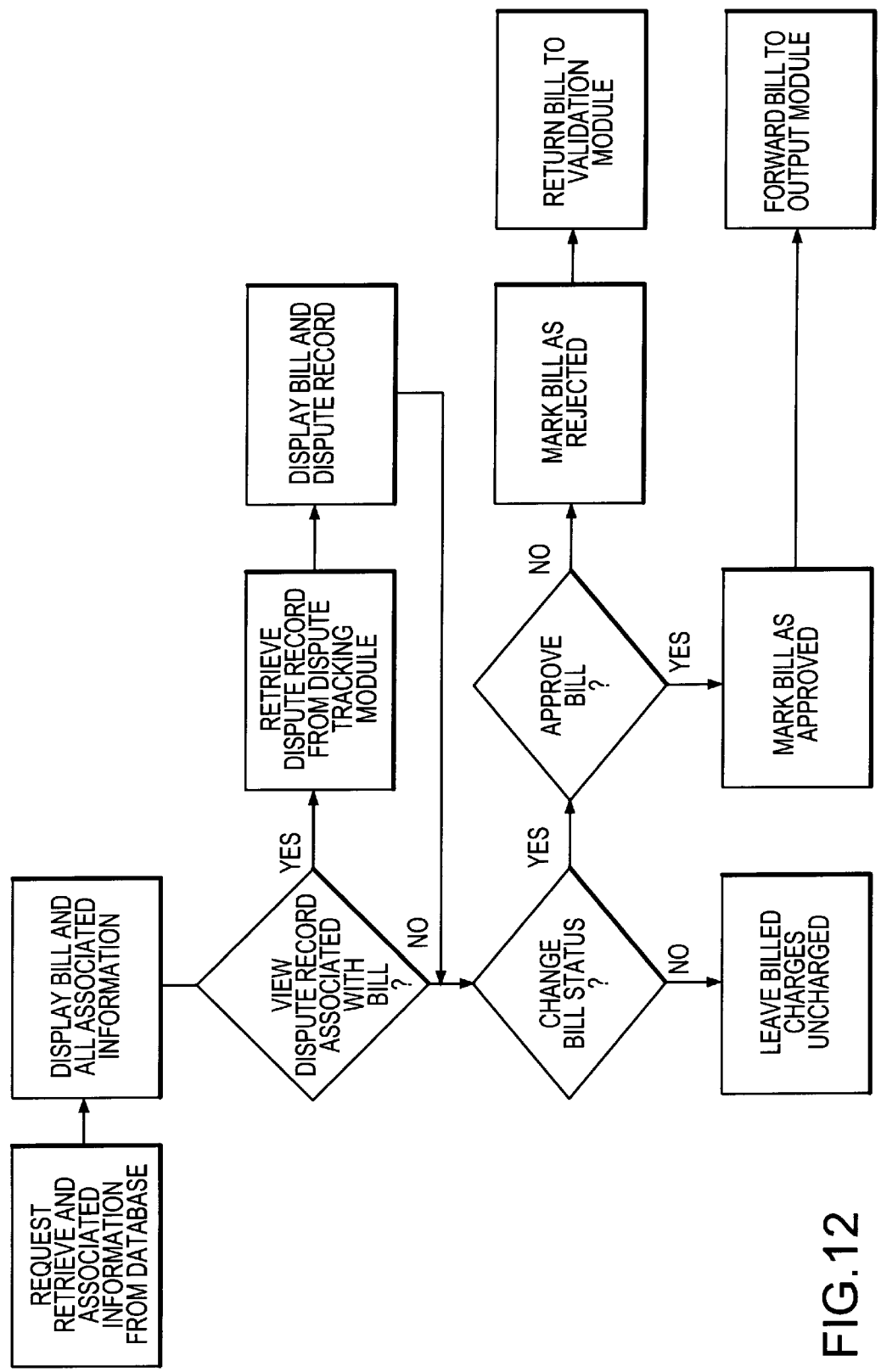
FIG. 12 discloses a flow chart which describes the operation of the bill review and approval module.

The detailed operation of the bill review and approval module is disclosed in FIG. 12. After a user has accessed the bill review and approval module, the system user requests that particular billed charge be retrieved from the database. After the request is input through the screen display, the billed charges are retrieved from the production database and displayed for the user. As was discussed above, all relevant information including itemized charges and dispute reports are displayed for the system user to review. During the review process the user may request to view the dispute report associated with the invoice. Once this information has been retrieved, it is displayed for the user to review. Once the system user has all the information necessary in order to either approve or disapprove a bill, a query is made as to whether a change of bill status is desired. The system user may choose to leave the bill information unchanged and return to it at a later point.

If the system user does wish to change the status of the bill, the user may approve or disapprove the bill for payment. The system user may mark the bill as approved in at least two scenarios. If there is no discrepancy report associated with this charge, the bill may be marked to be paid. If there is a discrepancy noted and an associated dispute report for this bill, the system user can mark the bill to be short paid and a discrepancy report sent to the vendor. Once these designations have been made, the bill is forwarded to the output module. If the system user decides to disapprove the bill, it is marked as rejected. A dialog box is provided in the invoice for the system user to enter reasons for the rejection. Reasons for rejection may include disagreement with the dispute report and, in particular, disagreement with the noted contract or tariff rates. Once the bill has been disapproved, it is transmitted back to the automatic validation module for further review. Once in the automatic validation module, a system user may assist the automated functions in that module to correct any errors noted in the dispute report.

Figure 13:
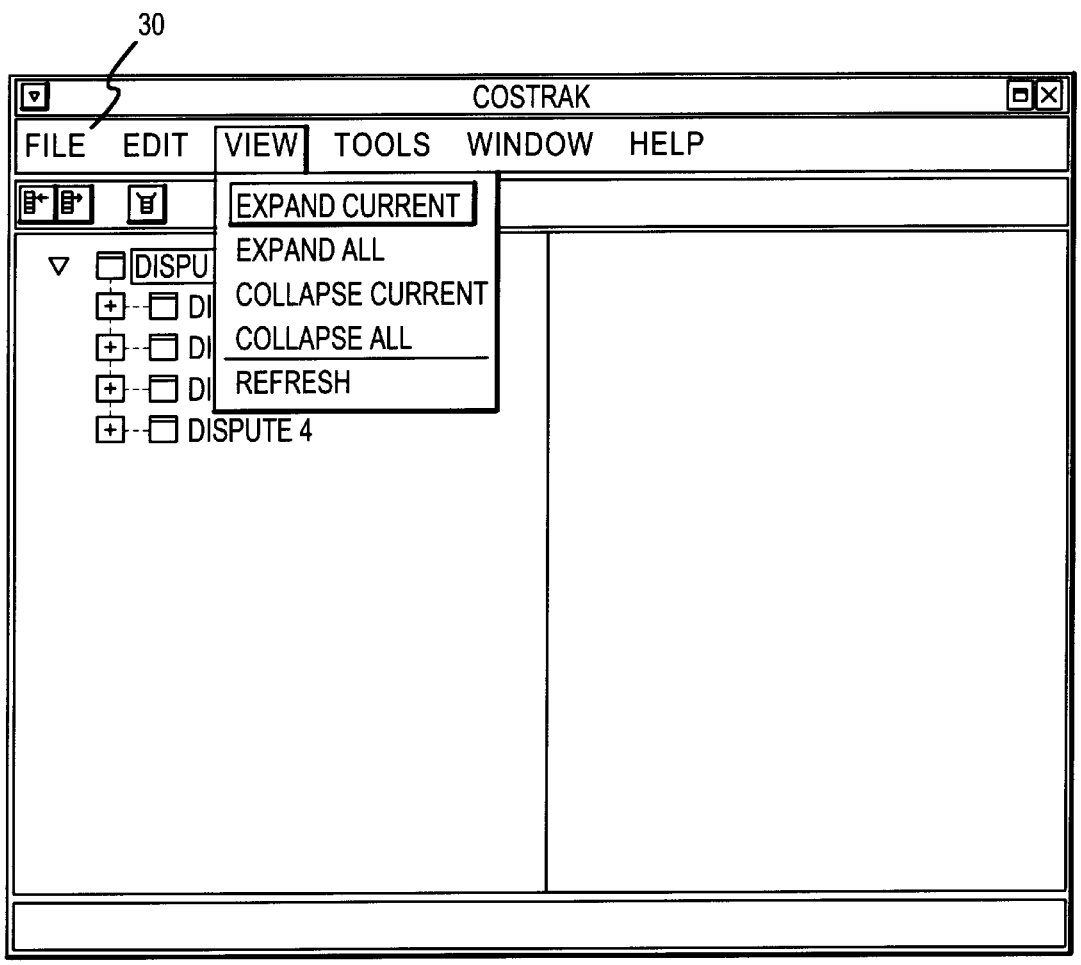
FIG. 13 discloses the functionality included in the view pull down of the main window.

A variety of other functionality is provided to the system user through the main window. Through the view pull down menus on tool bar 30, the system user has the option to expand a the hierarchial listing for one or all dispute reports and invoices. The option is also provided for collapsing the hierarchial structure for these same items. These options are shown in the screen display disclosed in FIG. 13.

Figure 14:
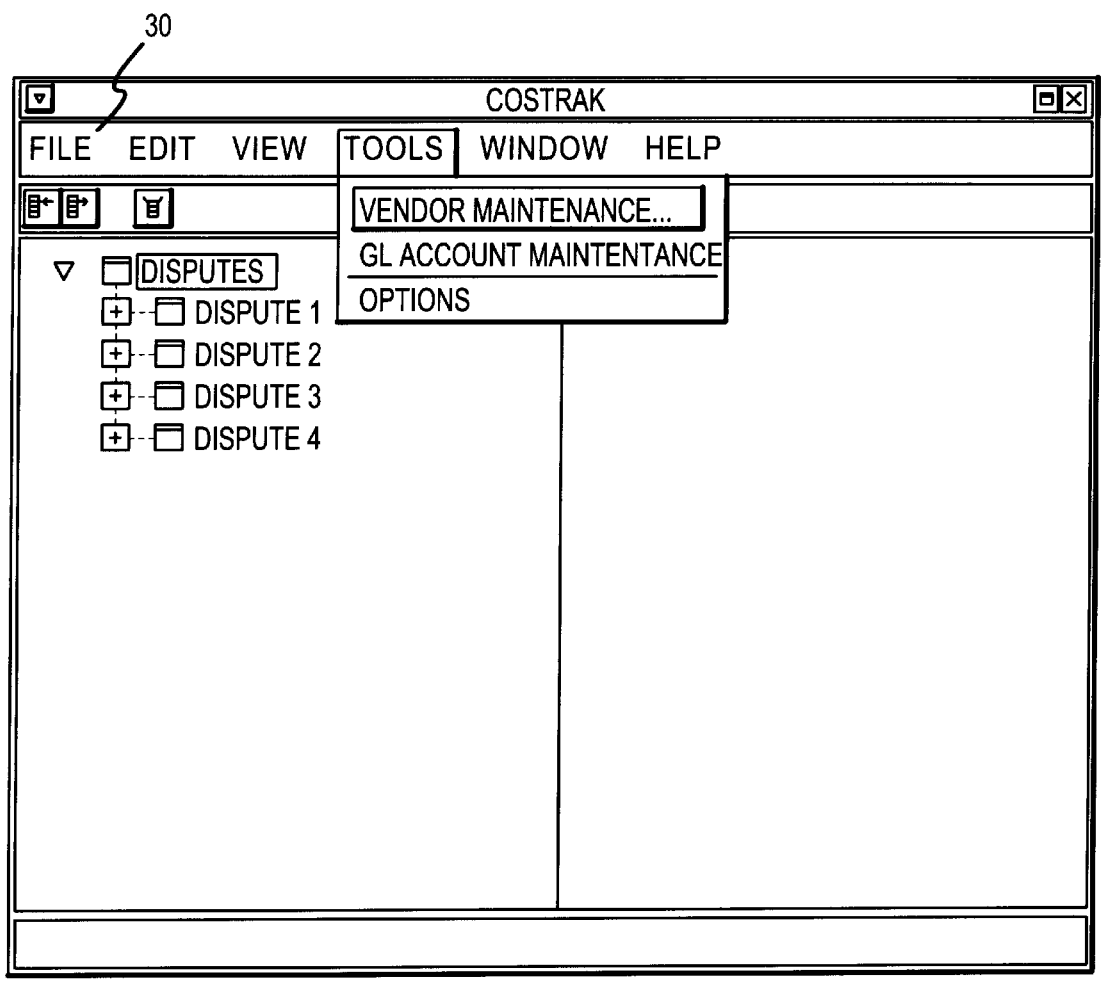
FIG. 14 discloses the functionality included in the tools pull down of the main window.
Figure 16:
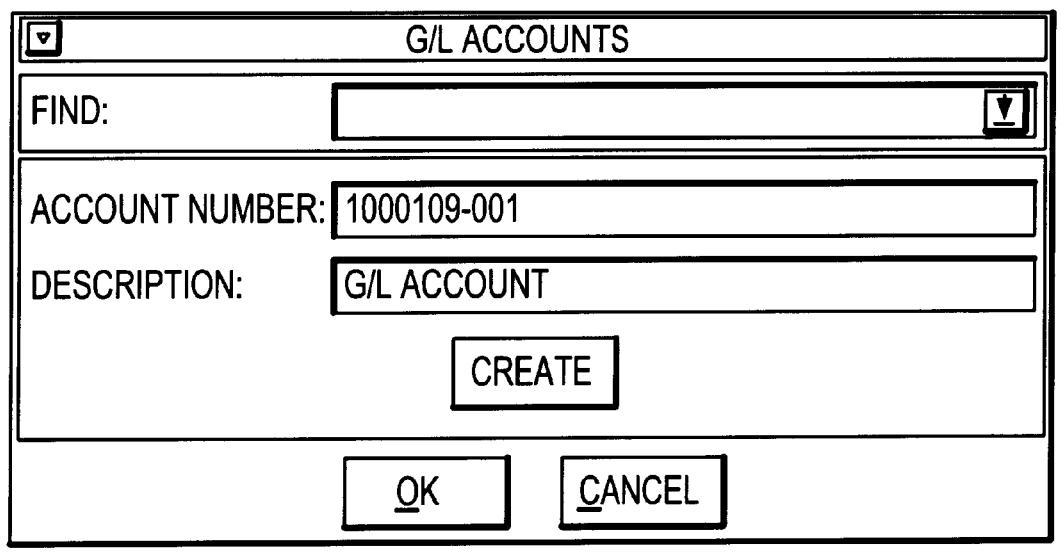
FIG. 16 discloses a screen display for providing account information.

Under the tools pull down menu as shown in FIG. 14, the system user is given the option of reviewing or amending information relating to a particular vendor or a particular account. In the situation where the system user chooses the vendor maintenance option, a screen display, as disclosed in FIG. 15, appears. In the find portion of the screen display, the user may enter a particular vendor, a vendor name, and the desired information for that vendor will appear below. Also with this screen, the system user may enter new vendor information If system user chooses the GL account maintenance option in the tool pull down menu, the screen display shown in FIG. 16 will be displayed. Through this screen display, the user can search for a particular account using account number or other identifying information. This information is then displayed for the system user. Also through this screen display, the system user may enter new account information.

Figure 17:
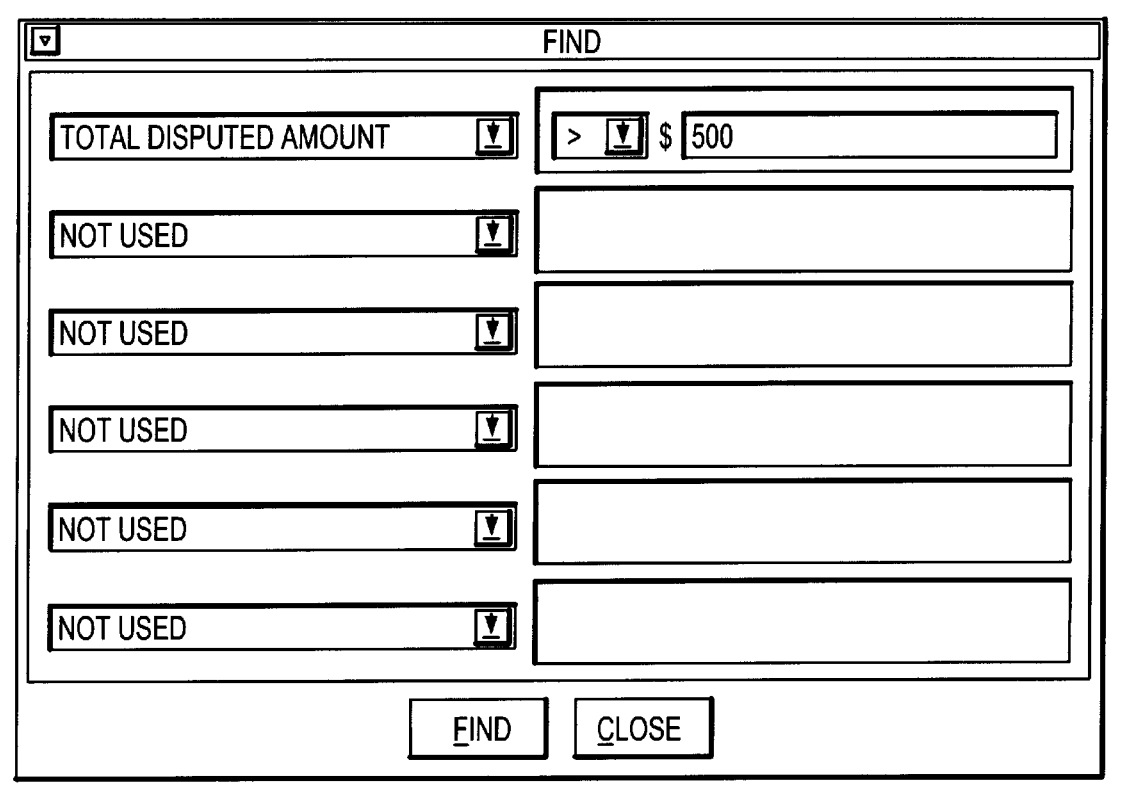

Additional functionality provided in the main window is the ability to search disputes and invoices which are currently being displayed. Under the edit pull down on tool bar 30, the find function may be selected and the screen display shown in FIG. 17 is provided for the system user. Within this screen display, the user can choose a particular subject area to search within and then in the right hand column enter limitations to that search The search is only performed on items currently being displayed in the main window.

If the invoice has been approved in the review and approval module, it is then transmitted to output module 24. The output module provides a generalized output format for both the accounts payable/bill disbursement file output (to electronically pay the billed charge via the client's automatic payment system) and also for the dispute report which is sent back to the vendor with whom a dispute is being pursued. These outputs may be either driven by a command entered through the GUI or outputs with an automatic scheduling system.

Figure 18:
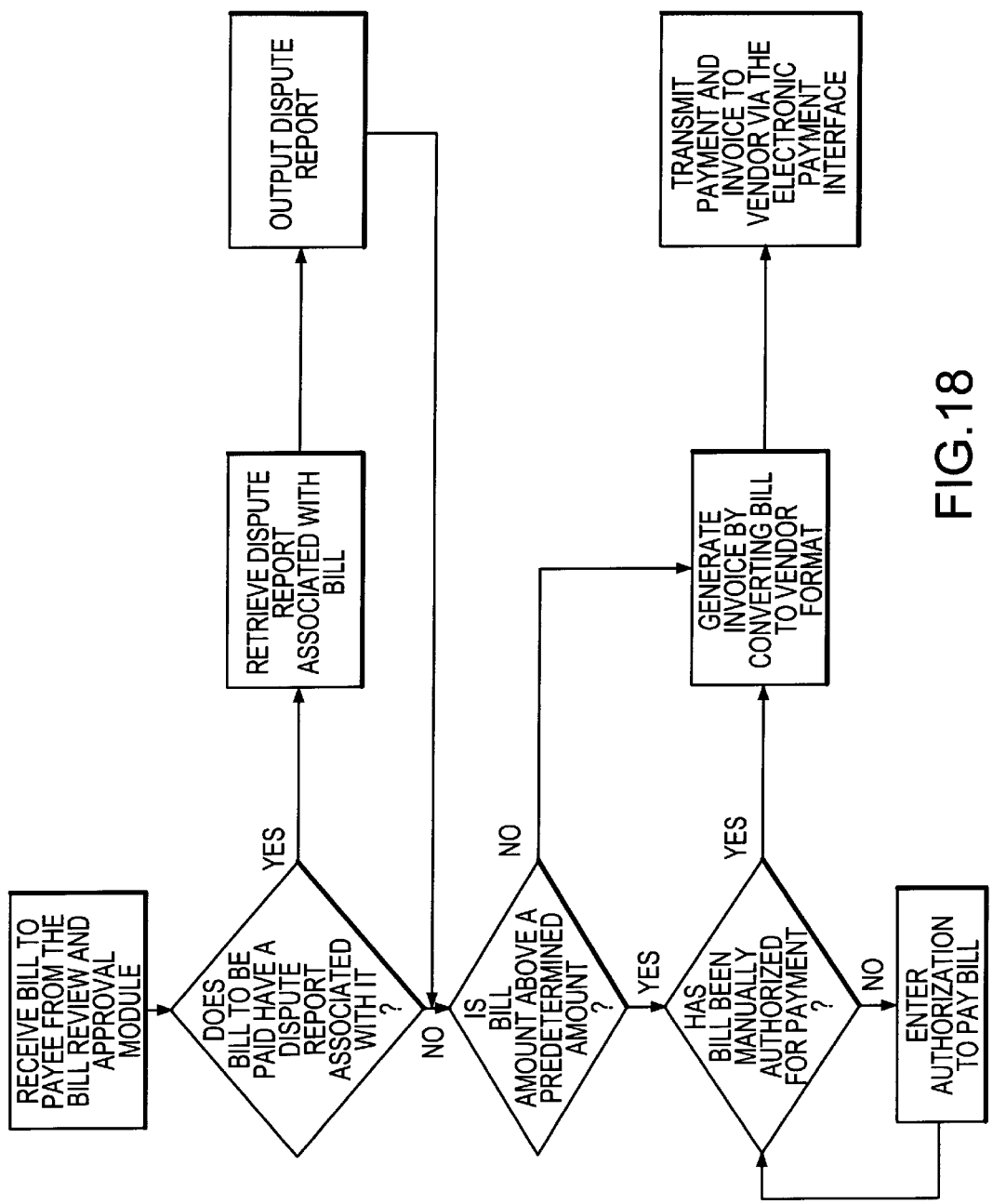
FIG. 18 discloses a flow chart which describes the operation of the output module.

The flow chart disclosed in FIG. 18 describes in detail the processes performed by the output module 24. After approval in the bill review and approval module, the billed charge is received by the output module. A first query is made as to whether the billed charge to be paid has a dispute report associated with it. If there is a dispute report associated, it is retrieved and output through a printer or other output device in hard copy form. Once in hard copy form the dispute report can be sent to the vendor. After the dispute report has been printed out, a query is made as to whether the amount to be paid is above a predetermined amount. As a precaution some companies, when paying bills, may require a certain level of authority to approve payment if it is greater than a predetermined amount. The output module provides notification to the system user that this sort of authorization is required. If authorization is given, a further query is made through the GUI as to whether their authorization for this payment amount has been received. If the authorization is received, an invoice is created for payment and this is output from the system in hard copy form. In the final step of the process, the electronic payment is transmitted to the vendor. This electronic payment may be either the fall amount originally charged by the vendor or a short pay amount which had been determined through the dispute tracking module. In the case where there has been a dispute and the bill has been short paid, the vendor receives the dispute report which then can be further negotiated with the customer at a later time. Once this dispute report is resolved, as was described above, the dispute report then can be closed as was described above.

The foregoing description of the present invention has been presented for purposes of illustration and description. Furthermore, the description is not intended to limit the invention to the form disclosed herein. Consequently, variations and modifications commensurate with the above teaching, and the skill or knowledge of the relevant art, are within the scope of the present invention. The embodiments described hereinabove are further intended to explain best modes known for practicing the invention and to enable others skilled in the art to utilize the invention in such or other embodiments and with various modifications required by the particular applications or uses of the present invention. It is intended that the claims be construed to include alternative embodiments to the extent permitted by the prior art.

What is claimed is:

1. An apparatus for processing billed charges from at least one vendor, comprising:
   a processor, comprising:
      an upload module which automatically uploads the billed charges from the at least one vendor in a first format, wherein the billed charges include a plurality of entries with a billed rate component; and
      a database which includes reference billing rate information; and
   at least one graphical user interface in connection with the processor, wherein the graphical user interface is configured to received the billed charges, wherein the at least one graphical user interface includes:
      an automatic validation module which receives the billed charges and automatically compares the billed rate component of the plurality of entries with the reference billing rate information to identify discrepancies:
      a dispute tracking module which generates at least one dispute file which may be associated with a particular one of the billed chargers, where the graphical user interface provides for display of both the billed charges and the at least one distpute file which is storable in and retrievable from the database; and
      a bill review and approval module which is operational in conjunction with a visual display which provides for selective accessing of and review of the billed charges and the associated at least one dispute file, and status changes relating to pavement of the billed charges, where the graphical display is fiber configured to receive input with regard to the billed charges, wherein the input includes at least one of: approve the billed charge and reject the billed charge.

2. The apparatus of claim 1, wherein the processor is a UNIX server.

3. The apparatus of claim 1 wherein the processor is connected to the at least one graphical user interface through a connection over a data network.

4. The apparatus of claim 3 wherein the connection is a ODBC TCP/IP connection.

5. The apparatus of claim 1 wherein the database is relational in nature.

6. The apparatus of claim 1 wherein the at least one graphical user interface is a computer workstation.

7. The apparatus of claim 1, further including at least one processing module from a group comprising:
   a bill review and approval module which provides for review of the information relating to the billed charges, and status changes relating to payment of the billed charges.

8. The apparatus of claim 7 wherein the automatic validation module, the dispute tracking module, and the bill review and approval module are part of a software package loaded on the at least one graphical user interface.

9. The apparatus of claim 8 wherein automatic validation module is programmable through the user interface to include custom criteria for identifying the discrepancies.

10. The apparatus of claim 1 wherein the processor further comprises an output module which provides for automated payment to the at least one vendor for the billed charges which have been approved.

11. The apparatus of claim 10 wherein the output module is in connection with output means which provides invoices for the approved billed charges and dispute reports to the at least one vendor.

12. A system for processing billed charges from a vendor comprising:
   a processor which provides automated uploading of the billed charges, storage of the billed charges and reference information in a database, and outputting of payment information related to the billed charges;
   a user interface which includes means for automatically validating the billed charges with regards to the reference information, generating at least one dispute report related to the billed charges, associating the at least one dispute report with the billed charges and providing for storage of the dispute reports in the database, and providing for a visual review of the billed charges with respect to any of the associated dispute reports, as well as disposition of the billed charges in response to a received input through the user interface; and
   a data network which provides communication between the user interface and the processor.

13. The system of claim 12 wherein the processor includes an upload module which automatically uploads the billed charges from the vendor, converts the billed charges from a first format to a second format, checks integrity of the billed charges, scans the reference information for duplicates of the billed charges, and stores the converted billed charges in the database.

14. The system of claim 12 wherein the processor is a UNIX server.

15. The system of claim 12 wherein the user interface includes an automatic validation module which automatically retrieves the billed charges from the database and identifies discrepancies between the converted billed charges and the reference information.

16. The system of claim 12 wherein the automatic validation module is programmable through the user interface to include custom criteria for identifying the discrepancies in the billed charges.

17. The system of claim 16 wherein the custom criteria include at least one of: contracted rates, tariffs, and rates established by third parties.

18. The system of claim 12 wherein the user interface is a computer workstation.

19. The system of claim 12 wherein the invoices and the dispute reports are displayed on the user interface according to a hierarchal structure.

20. The system of claim 19 wherein information included in the invoices is transferable to the dispute reports by employing a drag and drop function.

21. The system of claim 12 wherein the processor further includes an output module which provides for automatic payment to the vendor of the billed charges which have been approved.

22. The system of claim 21 wherein the output module further includes means for automatically requesting approval when the billed charges are above a predetermined amount.

23. The system of claim 12 wherein the user interface provides functionality to perform at least one of: view the billed charges, view the dispute reports, selectively associate the invoices with the dispute report, search the invoices, search the dispute reports, search for vendor information, and search for account information.

24. The system of claim 23 wherein the functionality is provided through screen displays presented on the user interface.

25. The system of claim 1 wherein the billed charges relate to usage of telephone lines and the reference information relates to agreements between parties relating to use of the telephone line.

26. The system of claim 25 wherein the reference information includes at least one of: circuit validity, circuit charges, tariffs.

27. The system of claim 11 wherein the billed charges relate to usage of telephone lines and the reference information relates to agreements between parties relating to use of the telephone line.

28. The system of claim 27 wherein the reference information includes at least one of: circuit validity, circuit charges, tariffs.

* * * * *

UNITED STATES PATENT AND TRADEMARK OFFICE
CERTIFICATE OF CORRECTION

PATENT NO. : 6,144,726
DATED : November 7, 2000
INVENTOR(S) : Cross

It is certified that error appears in the above-identified patent and that said Letters Patent is hereby corrected as shown below:

Column 13,
Line 26, please delete the word "chargers" insert therefor --charges--;
Line 34, please delete the word "pavement" and insert therefor --payment--;
Line 35, please delete the word "fiber" and insert therefor --further--.

Signed and Sealed this

Twenty-sixth Day of June, 2001

*Attest:*

*Nicholas P. Godici*

*Attesting Officer*

NICHOLAS P. GODICI
*Acting Director of the United States Patent and Trademark Office*